Figure 5:
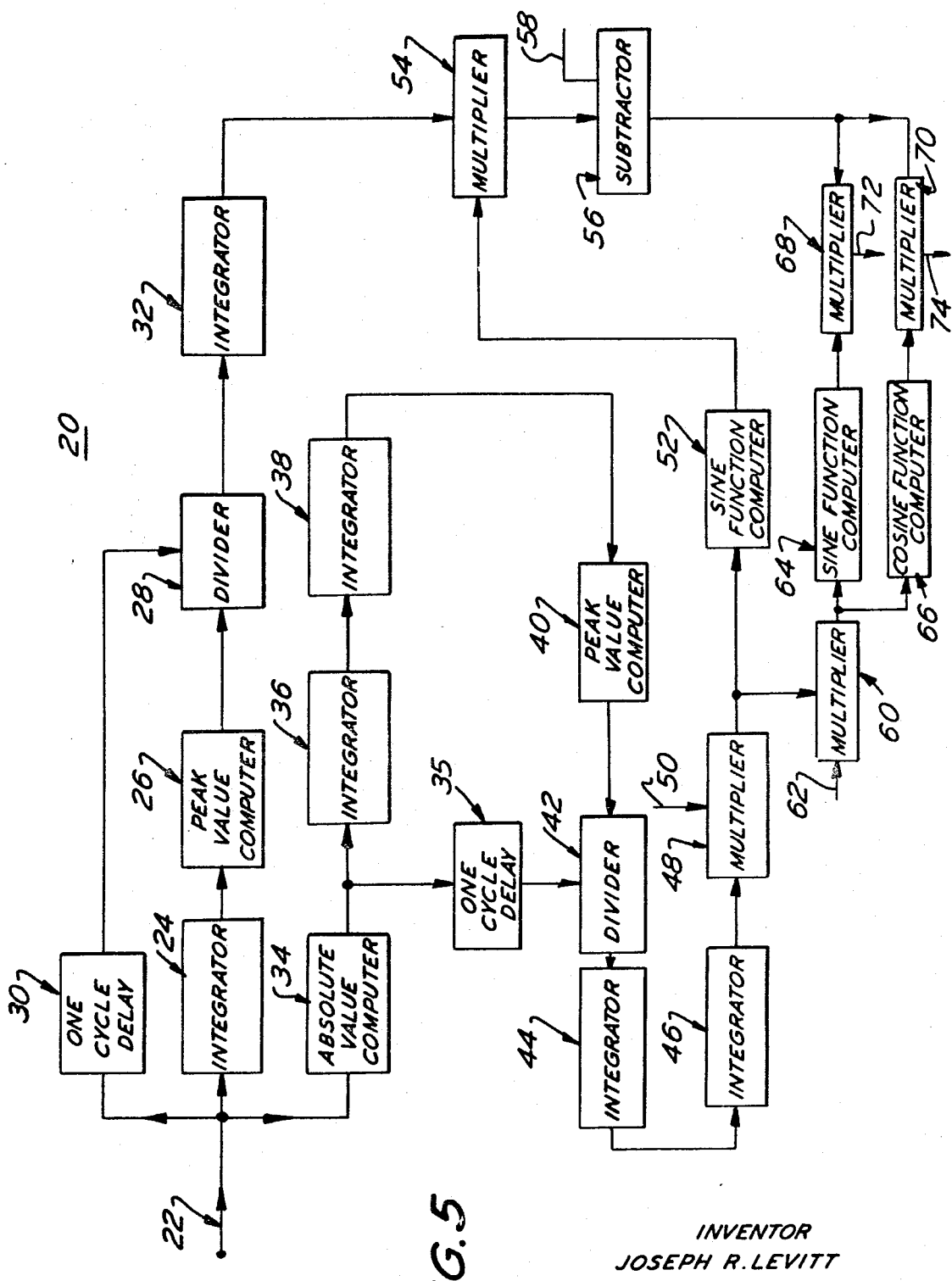

United States Patent

[11] 3,602,706

| [72] | Inventor | Joseph R. Levitt<br>Moorestown, N.J. |
|---|---|---|
| [21] | Appl. No. | 787,335 |
| [22] | Filed | Dec. 27, 1968 |
| [45] | Patented | Aug. 31, 1971 |
| [73] | Assignee | Data Display Systems, Inc.<br>New York, N.Y. |

[54] DATA-PROCESSING METHOD AND MEANS FOR CLASSIFYING SIGNALS IN A FIRST OR SECOND STATE
12 Claims, 5 Drawing Figs.

| [52] | U.S. Cl. | 235/193,<br>235/186, 128/2.06 |
|---|---|---|
| [51] | Int. Cl. | G06g 7/22,<br>A61b 5/04 |
| [50] | Field of Search | 235/193,<br>181, 186, 189, 190–192, 197, 198; 128/2.06;<br>324/20 T |

[56] References Cited
UNITED STATES PATENTS

| 2,214,299 | 9/1940 | Heller | 235/198 X |
|---|---|---|---|
| 3,131,297 | 4/1964 | Gates et al. | 235/189 |
| 3,123,768 | 3/1964 | Burch et al. | 128/2.06 X |
| 3,186,403 | 6/1965 | Bassett | 128/2.06 (VCG) |
| 3,323,068 | 5/1967 | Woods | 128/2.06 UX |

*Primary Examiner*—Malcolm A. Morrison
*Assistant Examiner*—Joseph F. Ruggiero
*Attorneys*—Robert S. Dunham, Howard J. Churchill, P. E. Henninger, Lester W. Clark, Thomas F. Moran, Gerald W. Griffin, R. Bradlee Boal, Christopher C. Dunham and Robert Scobey ABSTRACT: A data-processing method and means in which sets of time-varying signals characterizing systems under consideration in a known first condition or state and systems in a known second condition or state, which are not obviously distinguishable from the signals characterizing the first condition of state, are subjected to a plurality of nonlinear coordinate transformations which transform the signals into a transformed polar coordinate plane distinguishing the signals characterizing the system of the first condition or state from the signals characterizing the system in the second condition or state. In addition, using the selected transformations, first and second regions of the transformed plane are defined for characterizing transformed signals derived from systems in respectively unknown first and second conditions or states as being from systems respectively in said first and second conditions or states when contained respectively in said first and second regions.

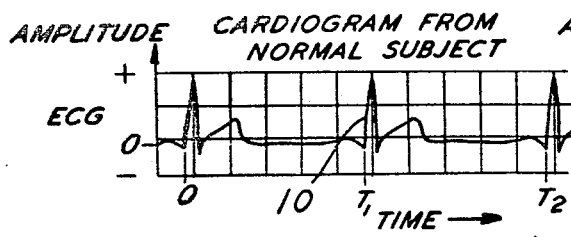
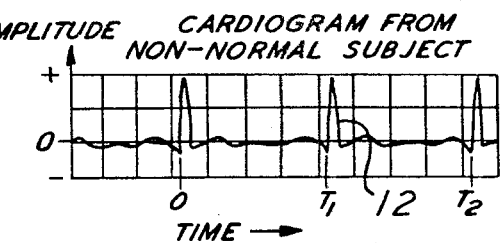
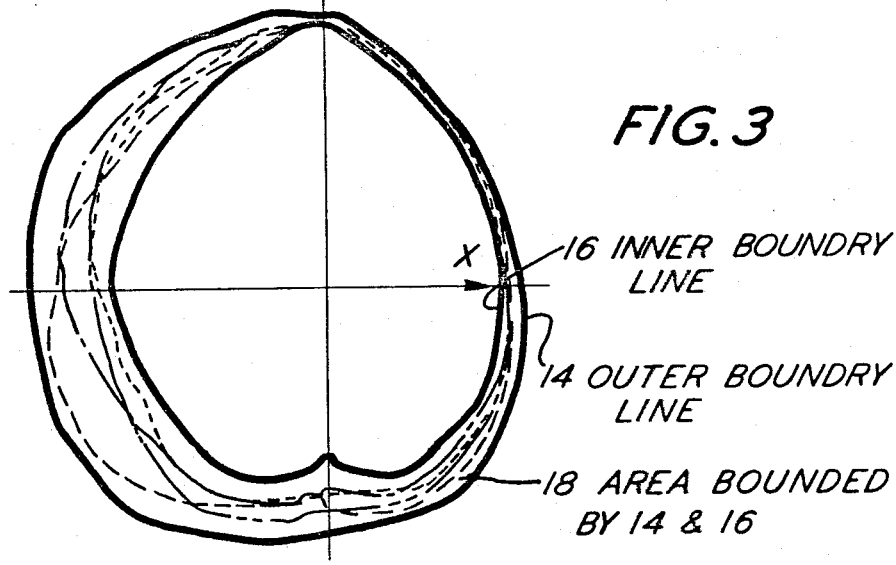
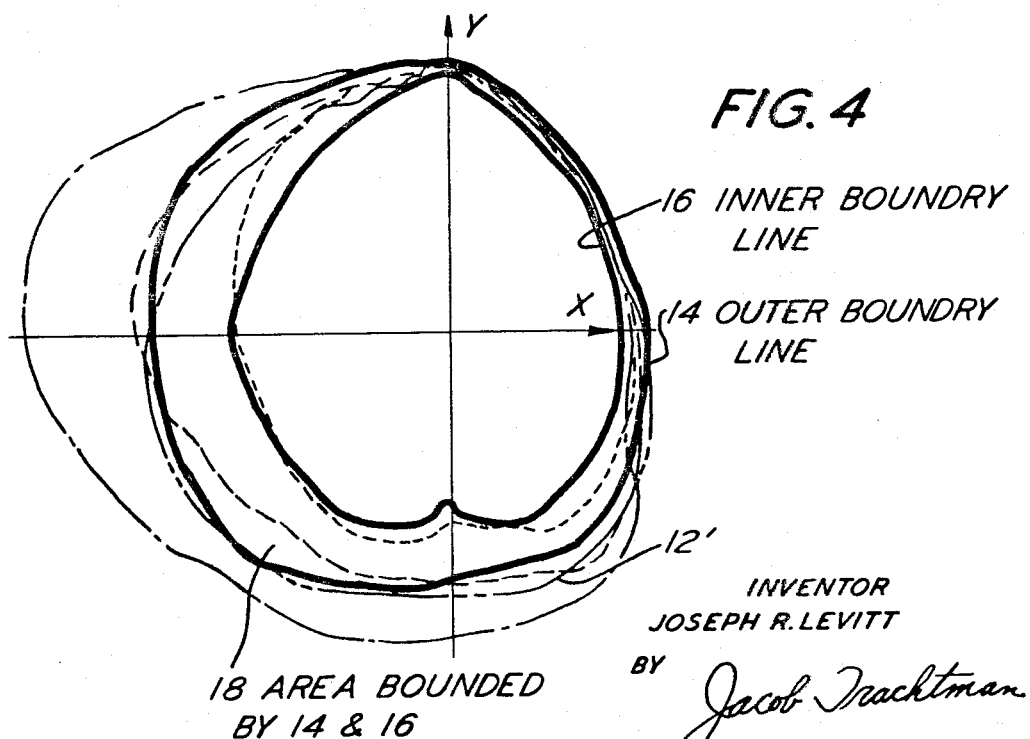

INVENTOR
JOSEPH R. LEVITT
BY Jacob Trachtman
ATTORNEY

DATA-PROCESSING METHOD AND MEANS FOR CLASSIFYING SIGNALS IN A FIRST OR SECOND STATE

This invention relates to data-processing method and means, and more particularly to the method and means for processing data to classify and derive information from said data.

The general problem of establishing the presence or absence of an essential characteristic of a physical system by analyzing the properties of data derived from an active or passive signal received from the system is common to many disciplines, such as radar, sonar, seismography and cardiography.

In each of these disciplines, the common problem is one of extracting sufficient significant information from a time-varying signal from the system, so that a classification of the system into one of several categories may be achieved.

To aid in this classification process, attempts have generally been made to formulate a mathematical model of the physical system in order to acquire an understanding of the basic underlying physical phenomena and the interrelationships between the various physical parameters which constitute the system. Proper interpretation of the data derived from the time varying signal, within the framework of the mathematical model of the system, results in the correct classification of the system.

In many cases, however, the physics of the system is known only imperfectly, the interrelationships between the various physical parameters are ill defined and complex, and a satisfactory mathematical model of the system cannot be formulated. Under such circumstances, proper classification of the data obtained cannot be readily achieved by means of purely analytical approaches.

In my copending application Ser. No. 372,493, filed June 4, 1964, now U.S. Pat. No. 3,442,264, issued May 6, 1969 and entitled "Data-Processing Method and Means," there is shown and described a new technique for accomplishing classification, which technique is particularly well suited for such disciplines where the physics is imperfectly known. The method of data-processing described in said copending application Ser. No. 372,493 comprises the steps of obtaining a set of time varying signals characterizing systems under consideration in a known first condition or state, and obtaining a set of time-varying signals characterizing said systems in a known second condition or state different from said first condition or state which are not obviously distinguishable from the signals obtained in the first step. The time varying signals obtained in the first and second steps are subjected to a plurality of nonlinear coordinate transformations. A nonlinear coordinate transformation of said plurality of transformations of the preceding step is selected which transforms the signals obtained through the first and second steps into a transformed two coordinate plane distinguishing signals characterizing systems of said first condition or state from signals characterizing systems in said second condition or state. The method further includes the steps of defining first and second regions of said transformed plane by use of said signals obtained in said first and second steps after being subjected to the selected transformations of the step preceding the present step, for characterizing transformed signals derived from systems in unknown first and second conditions or states, as being from systems respectively in said first and second conditions or states when contained respectively in said first and second regions.

It is an object of the present invention to provide another novel means and method for data-processing to determine the classification of data and obtain information about the systems from which data are passively or actively derived.

It is another object of the present invention to provide another novel method and means which easily allows the discrimination between signals of a system to determine quickly and accurately the condition of the system and also has the object of providing a closed-pattern display having a high degree of visual perceptibility.

It is still another object of the present invention to provide another new and improved method and means which allows determination of the condition of a system characterized by data derived therefrom by an operator having minimal training.

The above objects of the invention are achieved by providing a method of data-processing comprising the steps of obtaining a set of time varying signals characterizing systems under consideration in a known first condition or state, and obtaining a set of time-varying signals characterizing systems under consideration in a known first condition or state, and obtaining a set of time-varying signals characterizing systems in a second condition or state which are not obviously distinguishable from the signals obtained in the first step. The time-varying signals obtained in the first and second steps are subjected to a plurality of nonlinear coordinate transformations which transform the signals obtained through the first and second steps into a transformed polar coordinate plane providing closed curves whose properties are such that it readily serves for distinguishing signals characterizing systems of said first condition or state from signals characterizing systems in said second condition or state.

The method further includes the steps of defining first and second regions of said transformed plane by use of said signals obtained in said first and second steps after being subjected to the selected transformations of the step preceding the present step, for characterizing transformed signals derived from systems in unknown first and second conditions or states, as being from systems respectively in said first and second conditions or states when contained respectively in said first and second regions.

The method also contains more particularly the additional step in which the transformed signals are normalized for defining said first and second regions, and the step of determining the locations of transformed signals from systems in unknown first and second conditions or states subjected to the selected transformation for establishing whether such systems with unknown conditions or states are respectively in said first or second conditions or states. By normalizing such signals they can be processed and compared more readily.

In more specific form, the above method of the invention is carried out for determining the condition or state of the system characterized by a time-varying signal by the steps of obtaining a time-amplitude-varying signal characterizing a system in either the first or second condition or state given by $S=S(t)$, transforming the time-varying signal $S(t)$ of the first step by transformation into a plane of polar coordinates $\theta$ and $r$ defined by the form:

$$\theta = 2\pi P_2 \int \int |S| dt dt$$
$$r = 1 - P_1(\int S dt) \sin(\pi P_2 \int \int |S| dt dt)$$

where $P_1$ and $P_2$ are normalizing factors, and the $\theta, r$ plane has regions or bounding areas corresponding to the first and second conditions or states of the first step which determine the location of said transformed signal in the transformed plane with respect to said first and second regions for establishing whether the system of the first step is in said first or second condition or state.

For ease of recording, the polar coordinates $\theta r$ may be transformed into a plane of coordinates $x$ and $y$ defined by the form:

$$x = R\cos\theta$$
$$y = r\sin\theta$$

The foregoing and other objects of the invention will become more apparent as the following detailed description of the invention is read in conjunction with the drawings, in which:

FIG. 1 is a graphic representation of data in the form of a time-varying signal known as a cardiogram characterizing the cardiac condition of a subject constituting one of a group of many cardiograms characterized as normal, FIG. 2 is a graphic representation of data in the form of a time-varying signal known as a cardiogram characterizing the cardiac condition of the nonnormal subject and being one of many such graphs which are nonnormal with respect to the condition or state characterized by the cardiograms of FIG. 1, FIG. 3 is a graphic representation of a plurality of curves derived from the group of cardiograms which includes the cardiogram of FIG. 1 after having been transformed by a nonlinear transformation into the x,y plane, FIG. 4 is a graphic representation of a plurality of curves derived from the group of cardiograms which includes the cardiogram of FIG. 2 after having been transformed by a nonlinear transformation into the x,y plane, and FIG. 5 schematically illustrates an apparatus for performing the method of the present invention.

Although the method of the present invention may be used in various arts including radar, sonar, seismography, cardiography and other arts, the method will be particularly described herein in connection with the use of data obtained from animate subjects by means such as cardiography.

In this connection, FIG. 1 graphically represents as a function of time a periodic signal 10 varying in amplitude derived from an animate subject in the form of a cardiogram. The cardiogram is shown to be cyclic in nature, several periods beginning and ending at 0, $T_1$ and $T_2$ being illustrated in FIG. 1. The cardiogram illustrated in FIG. 1 is derived from and is one of a group of 14 actual cardiograms. The group of 14 cardiograms, each taken of a respective animate subject, namely human subjects, and in connection with which the method of the invention is described and illustrated herein, have been a priori determined to be and, for the purpose of this illustration, are classified as cardiograms from normal subjects.

Similarly, FIG. 2 graphically represents an amplitude time-varying function 12, also depicted as cyclic in nature and showing several periods beginning and ending at 0, $T_1$ and $T_2$. The cardiographic signal 12, which is one of a group of 14 cardiograms taken of animate human subjects, is representative of and particularly characterized a priori for the purpose of illustrating the method as cardiograms from nonnormal subjects.

The first and second classifications of the respective normal and nonnormal cardiograms are taken as known for the purpose of the method and may be thus characterized by a knowledge of the subject attained by the study of the history before and/or after the taking of the cardiograms of the animate subject. Thus, the two groups of normal and nonnormal cardiograms, and thus classed, are not distinguished or classified necessarily by an examination of the cardiograms as presented. However, the classification of the cardiograms into groups or different classes may be achieved by any desired means and the cardiograms, as thus classified, are used in carrying out the method as further described herein.

In order to differentiate and distinguish between the data in one classification and the data in another classification, the data which, in this case, comprise the cardiograms represented by the groups of which FIGS. 1 and 2 show a single respective cardiogram, are first subjected to a transformation of the following form:

$$f = \int S^m dt$$
$$g = \int \int |S|^n dt dt$$

for transformation to a $g,f$ two-dimensional plane.

The exponents $m$ and $n$ are so chosen that a transformation of the data results, in which the data of one classification can be readily distinguished from transformed data of the other classification. A satisfactory transformation for he cardiogram data of which FIGS. 1 and 2 represent individual members of respective groups of normal and nonnormal cardiographic information, is found to have the form $$f = \int S dt$$
$$g = \int \int |S| dt dt$$

for the purpose of the method. The transformed data were normalized to provide a maximum value of 1 (the number "one") for each of the $f$ coordinate and the $g$ coordinate of the transformed data. In order to provide such normalization, the transformation coordinates for the transformed data are defined by the form $$f = P_1 \int_0^T S dt$$
$$g = P_2 \int_0^T \int_0^T |S| dt dt$$

where $P_1$ and $P_2$ are normalizing factors and T is a specific instant of time $t$, of the cardiographic signal being transformed.

Solving the above equations for $P_1$ and $P_2$ gives the following respective expressions where $t_1$ is a specific instant of time at which the denominator in the following expression for $P_1$ is at positive maximum or at negative minimum, whichever is greater in absolute value; $t_2$ is a specific instant of time at which the denominator in the following expression for $P_2$ is at positive maximum; and to in the expressions for $P_1$ and $P_2$ below is a time instant coinciding with the beginning of the time periods starting at 0, $T_1$, $T_2$ etc. as shown in FIGS. 1 and 2.

$$P_1 = \frac{f_{max.}}{\int_{t_0}^{t_1} S dt}$$

$$P_2 = \frac{g_{max.}}{\int_{t_2}^{t_2} \int_{t_0}^{t_2} |S| dt dt}$$

It is noted that the value of $P_1$ and $P_2$ depend upon the set of data or information signal S being processed, and therefore may change with each set of data or each information signal processed.

With $f_{max}$ and $g_{max}$ both being set equal to 1 for normalizing purposes, the above expressions reduce to $$P_1 = \frac{1}{\int_{t_0}^{t_1} S dt}$$

$$P_2 = \frac{1}{\int_{t_2}^{t_2} \int_{t_0}^{t_2} |S| dt dt}$$

The transformed data is then subjected to a further transformation of the following form:

$$\theta = 2\pi g$$
$$r = 1 - f \sin \pi g$$

for transformation to a $\theta, r$ polar coordinate form, where $\theta$ is the angle, and $r$ is the radius. Inserting the previously given expressions for $f$ and $g$, the expressions for $\theta$ and $r$ are found to have the form $$\theta = 2\pi P_2 \int \int |S| dt dt$$
$$r = 1 - (P_1 \int S dt) \sin (\pi P_2 \int \int |S| dt dt)$$

Further inserting the previously given expressions for $P_1$ and $P_2$, the expressions for $\theta$ and $r$ are found to have the form $$\theta = 2\pi \frac{\int \int |S| dt dt}{\int_{t_0}^{t_2} \int_{t_2}^{t_2} |S| dt dt}$$

$$r = 1 - \frac{\int S dt}{\int_{t_2}^{t_1} S dt} \sin \frac{\pi \int \int |S| dt dt}{\int_{t_0}^{t_2} \int_{t_0}^{t_2} |S| dt dt}$$

Normalizing the transformation as described above corresponds to the particular normalization of the transformed curves illustrated in FIGS. 3 and 4, and the normalization described below in connection with the operation of the apparatus of FIG. 5 carrying out the method of the invention. Also, to obtain the curves illustrated in FIGS. 3 and 4, the polar coordinates $\theta, r$ were transformed to $x, y$ coordinates by the transformation $$x = r\cos\theta$$
$$y = r\sin\theta$$

FIG. 3 is a graphic representation in the $x$, $y$ plane of a selected plurality of cardiograms, including cardiogram 10 of FIG. 1, which are classified as normal, while FIG. 4 shows curves in the $x$, $y$ plane of a selected group of cardiograms characterized as nonnormal including in its group the cardiogram 12 of FIG. 2.

A plurality of cardiographic signals similar to the cardiographic signal 10 are shown transformed into the $x$, $y$ plane of FIG. 3 as dashed and dotted lines, while a plurality of cardiographic signals similar to the cardiographic signal 12 of FIG. 2 are shown as the curves in FIG. 4 when transformed into the $x$, $y$ plane, using the transformation in which $m$ and $n$ are equal to 1. The selected nonlinear transformation for transforming the cardiographic signals to the polar coordinates, and receiving recording them in the $x$, $y$ plane and obtaining sufficient discrimination and differentiation between them to determine separate classification is illustrated by FIGS. 3 and 4. An envelope, illustrated by the dark lines 14 and 16, is drawn respectively around and within the curves of the transformed data characterized as normal cardiographic signals and contain the curves of each of the normal cardiograms therein. No portion of the transformed data extends outside the boundaries formed between the curves 14 and 16 which are drawn expressly for the purpose of containing the curves within a restricted region.

Thus, in observing the bounded region 18 forming an annular area strip between the curves 14 and 16, it is noted that the selected transformation is effective in restricting and providing transformed curves for the data of the normal cardiographic signals within a highly narrow and limited area or region. The bounding lines 14 and 16 of the strip 18 are transferred to the $x$, $y$ plane of FIG. 4 for indicating the region in which the normal curves for the selected cardiographic data are confined. The transformation of the cardiographic signals classified as nonnormal data shows that some portion, in many cases large portions, of the transformed curves lie wholly outside the annular region 18 which is bounded on the inside by curve 16 and is bounded on the outside by curve 14. Normal curves are entirely within the annular area 18; other curves extend either in the area enclosed by the curve 16, or in the area outside that enclosed by the curve 14, or in both. Thus, the nonnormal transformed data is readily differentiated and distinguished from normal data by the selected transformation to the coordinate system described above.

With the submission of further cardiographic data in the form of cardiograms of the type which have been classified by the method illustrated in FIGS. 3 and 4, the graph of the transformed data is plotted and the classification determined by the position of the transformed data of the unknown signal with respect to the region 18 illustrated in FIG. 3. If the transformed curve lies within the region 18, the data are classified as being in the group of normal cardiographic signals. On the other hand, if the data are transformed into the second region outside of the region 18, either outside the boundary line 14 or outside the boundary line 16, then such data are clearly classified as in the group of nonnormal signals. In the case where a significant portion of the signal, as in the case of the transformed signal 12', lies outside of the region 18 even though the remaining portion of the signal lies within the region 18, the signal is classified as belonging to the nonnormal group of signals.

In connection with the cardiographic information utilized, it is noted that standard cardiograms were obtained, using data derived from the standard lead number 1, 2 and $V_6$ (the first two sometimes respectively referred to as lead numbers I and II), designations well known in the art. The initiation of the signal processing is commenced with the end of the Q-wave or the beginning of the R-wave a designation well known in the electrocardiographic art, for the purpose of producing the graphs in FIGS. 3 and 4. It is noted that the use of the method, however, is not limited to the use of a particular lead of cardiographic producing equipment or the point of initiation of the period of the signal data, and that the method may be used for other leads for classification of corresponding groups of cardiograms into normal and nonnormal classes as well as the use of the method with entirely unrelated systems, such as in connection with radar, sonar, and seismography, systems failure detection, as examples.

For the above, it is noted that the method may readily be carried out by hand and the following is an illustration of one of many means which may be employed to classify data, in this particular illustration, cardiographic signals, into normal or nonnormal classifications. For this purpose, refer to FIG. 5 which schematically illustrates signal processing apparatus 20 having an input terminal 22 receiving amplitude time varying cardiographic signals similar to those illustrated in FIGS. 1 and 2. Such cardiographic signals have a cyclic nature and constitute information having a period $T_1$.

An input signal, which is a function of time and designated as $S(t)$ and is an amplitude varying voltage, is delivered to the input lead 22 of an integrator 24. The output signal of the integrator 24, which is $\int S\, dt$, is delivered to circuit means 26 which computes the peak value of $\int S\, dt$ at the time $t_1$ during the cycle of the signal. As previously stated, the normalizing factor $P_1$ equals $1 / \int_{t_0}^{t_1} S\, dt$. Thus, the output signal of the peak value circuit means 26 is $1/P_1$. The output signal of the peak value computer 26 is delivered to a divider 28. Also delivered to the divider 28, is the input signal $S(t)$ which is delivered from the input terminal 22 through a one-cycle delay 30 so that the input signal reaches the divider 28 at the same time as the output signal from the peak value computer 26. The divider 28 divides the input signal $S(t)$ by the output signal of the peak value computer so that the output signal of the divider 28 is $P_1 S(t)$. The output signal from the divider 28 is delivered to an integrator 32 which integrates the output signal $S(t)$. Thus, the output signal of the integrator 32 is $P_1 \int S\, dt$.

The input signal $S(t)$ is also delivered from the input terminal 22 to a computer circuit 34 for determining the absolute value of $S$. The signal from the circuit 34 is then delivered to an integrator 36 which feeds the signal to a second integrator 38. Thus, the output of the second integrator 38 is $\int\int |S|\, dt\, dt$. The output of the second integrator 38 is delivered to a computer circuit 40 which computes the peak value of $\int\int |S|\, dt\, dt$ at the time $t_2$ of the cycle of the signal. As previously stated, the normalizing factor $P_2$ equals $1 / \int_{t_0}^{T_2} \int_{t_0}^{T_2} |S|\, dt\, dt$. Thus, the output signal of the peak value computer 40 is $1/P_2$. The output signal of the peak value computer is delivered to a divider 42. Also delivered to the divider 42 is the absolute value of the input signal from the absolute value computer 34. The absolute value signal is delivered to the divider 42 through a delay circuit 35 which delays the signal by one cycle so that it reaches the divider at the same time as the signal $1/P_1$ from peak value computer 40. The divider 42 divides the absolute value of the input signal by the output of the peak value computer 40 so that the output of the divider 42 is $P_2 |S|(t)$. The output of the divider 42 is then delivered to an integrator 44 which feeds its output to a second integrator 46. The output signal of the same integrator 46 is $P_2 \int \int |S|\, dt\, dt$.

The output from the second integrator 46 is delivered to a multiplier 48. Also delivered to the multiplier 48 through the terminal 50 is the value $\pi$. The output of the multiplier 48 is delivered to a sine function computer 52. Thus, the output of the sine function computer 52 is $\sin \pi P_2 \int\int |S|\, dt\, dt$. This output of the sine function computer 52 is delivered to a multiplier 54. Also delivered to the multiplier 54 is the output of the integrator 32. Thus the output of the multiplier 54 is $P_1 \int dt (\sin \pi P_2 \int\int |S|\, dt\, dt)$. The output of the multiplier 54 is delivered to a subtractor 56. Also delivered to the subtractor 56 through the terminal 58 is the value 1 (one). The subtractor 56 subtracts from the value 1 the output of the multiplier 54. Thus, the output of the subtractor 56 is $1, -P_1 \int dt(\sin \pi P_2$ $\int \int |S| dt\, dt$). Referring back to the transformations to polar coordinate form previously given, it can be seen that the output of the subtractor is the value $r$. It can also be seen that the output of the multiplier 48, which is $\pi P_2 \int \int |S| dt\, dt$, is $\theta/2$.

To permit the polar coordinates $\theta$, $r$ to be plotted in the $x$, $y$ coordinate form, the output of the multiplier 48 is delivered to a multiplier 60. Also delivered to the multiplier 60 through a terminal 62 is the value 2 (two). Thus, the output of the multiplier 60 is $\theta$. The output of the multiplier 60 is delivered to a sine function computer 64 and to a cosine function computer 66 which are in parallel circuits. The outputs of the sine function computer 64 and the cosine function computer 66 are delivered to separate multipliers 68 and 70 respectively. Also delivered to each of the multipliers 68 and 70 is the coordinate $r$, which is the output of the subtractor 56. Thus, the output of the multiplier 68 is $r\sin\theta$, which is the coordinate $y$, and the output of the multiplier 70 is $r\cos\theta$, which is the coordinate $x$.

The output terminals 72 and 74 of the multipliers 68 and 70 respectively are connected to a suitable recorder for recording in visual form the output signals from the multipliers. Any well-known recorder which will record in an $x$, $y$ coordinate plane can be used, such as a standard-type cathode ray display tube or an inked pen recorder. Thus, when a particular cardiographic signal is being received by the apparatus 20 at its terminal 22, a curve, such as the curves shown in FIGS. 3 and 4, is displayed by the recorder. To determine whether the curve displayed represents a normal or nonnormal condition or state, a mask having thereon the $x$, $y$ axis and the boundary lines 14 and 16 shown in FIGS. 3 and 4 can be placed over the curve displayed. If the curve displayed lies wholly within the area 18 between the boundary lines 14 and 16, the curve represents a normal condition; whereas, if any part of the displayed curve extends outside the area 18, the curve represents a nonnormal condition. If the recorder is a cathode ray tube, the boundary lines 14 and 16 may be formed directly on the face of the cathode ray tube. For other types of recorders, the mask may be a sheet of transparent material having the boundary lines 14 and 16 thereon.

In the apparatus 20, the integrators 24, 32, 36, 38, 44 and 46 should be reset to zero at the end of each cycle of the input signal to the apparatus. This can be achieved by connecting to the integrators a sequencing circuit which at the end of each cycle of the input signal disconnects the integrators from their sources of of input signals and shorts their outputs to their outputs to their inputs so as to discharge the integrators and ready them for another integration during the next period of the input signal at terminal 22. One such sequencing circuit is shown in my application Ser. No. 372,493 now Pat. No. 3,442,264 issued May 6, 1969. Thus, the output terminals 72 and 74 deliver signals concurrently to the recorder during alternate periods of the input signal, thereby allowing time for the discharge of the integrators between integrations.

The method and apparatus illustrated and described in detail above relate to the processing of signals characterizing the condition of a system and cardiographic signals in particular have been treated. In general, the method and apparatus may readily be applied in connection with radar, sonar, seismographic and other such data susceptible to being distinguished by nonlinear transformation of the data by appropriate formula as taught above.

The embodiments of the invention in which an exclusive property or privilege is claimed are defined as follows:

1. Machine implemented process for determining the physical state of a system characterized by a time-varying signal which comprises the following steps, each of which is executed by automatic computing apparatus
   a. obtaining a time-varying signal characterizing a system in either a first or second physical state,
   b. transforming the time-varying signal obtained in step into a coordinate system having at least one curvilinear coordinate. (a) by a nonlinear coordinate transformation which transformation transforms said signal into defined first or second classes corresponding to the first and second physical states of step (a)
   c. and determining whether said transformed signal of step (b) is the first or second class defined by step (b) for establishing whether the system of step (a) is in said first or second state.

2. Machine-implemented process as in claim 1 in which
   a. the signal obtained is a time-amplitude varying signal characterizing a system in either a first or second physical state given by $S=S(t)$,
   b. the time varying signal of step (a) is transformed by a transformation into a plane with polar coordinates $r$ and $\theta$ defined by the form $r = 1 - \int S^m dt \ (\sin \pi \int \int |S^n| dt dt)$
   $\theta = 2\pi \int \int |S^n| dt dt$ where $m$ and $n$ are respective predetermined exponential values of S and said $r$, $\theta$ plane has regions corresponding to the first and second physical states of step (a).

3. Machine-implemented process as in claim 2 including the step of transforming the polar coordinates $r$ and $\theta$ into a plane with coordinates $x$ and $y$ defined by the form
   $x = r\cos\theta$
   $y = r\sin\theta$ 4. Machine-implemented process as in claim 3 in which the time varying signal of step (a) is an electrocardiographic signal of a subject and the first and second physical states of said system characterized by said signal are a normal cardiac and a nonnormal cardiac condition.

5. Machine-implemented process as in claim 1 in which
   a. the signal obtained is a time-amplitude-varying signal characterizing a system in either a first or second physical state given by $S=S(t)$,
   b. the time-varying signal $S=S(t)$ of step (a) is transformed by a transformation into a plane with polar coordinates $r$ and $\theta$ defined by the form $r = 1 - (P_1 \int S dt) \sin (\pi P_2 \int \int |S| dt dt)$
   $\theta = 2\pi P_2 \int \int |S| dt dt$ where $P_1$ and $P_2$ are normalizing factors and said $r$, $\theta$ plane has regions corresponding to the first and second physical states of step (a)

6. Machine-implemented process as in claim 5 including the step of transforming the polar coordinates $r$ and $\theta$ into a plane with coordinates $x$ and $y$ defined by the form
   $x = r\cos\theta$
   $y = r\sin\theta$ 7. Machine-implemented process as in claim 6 in which the time-varying signal of step (a) is an electrocardiographic signal of a subject and the first and second physical states of said system characterized by said signal are a normal cardiac and a nonnormal cardiac condition.

8. A data-processing means comprising:
   a. input means for receiving time-varying signals characterizing the physical state of a system,
   b. first processing means integrating signals received from said input means and delivering a first output signal,
   c. second processing means determining the absolute value of the signal received from said input means and delivering a second output signal,
   d. third processing means integrating second output signals from said second processing means and d delivering a third output signal,
   e. fourth processing means integrating third output signals from said third processing means and delivering a fourth output signal,
   f. fifth processing means multiplying fourth output signals from said fourth processing means times the value $\pi$ and delivering a fifth output signal,
   g. sixth processing means multiplying fifth output signals times the value 2 and by the value of a normalizing factor $P_2$ and delivering a sixth output signal,
   h. seventh processing means receiving and multiplying by said normalizing factor $P_2$ the fifth output signals, determining the sine function of the resulting signals and delivering a seventh output signal, i. eighth processing means multiplying seventh output signals times first output signals times a normalizing factor $P_1$ and delivering an eighth output signal, j. ninth processing means subtracting eighth output signals from the value 1 and delivering a ninth output signal, and k. tenth means receiving said sixth and ninth output signals and indicating the physical state of said system.

9. The means of claim 8 including means for respectively normalizing said first and third output signals.

10. The means of claim 9 in which the tenth means includes:

a. eleventh processing means receiving the sixth output signal, determining the sine function of said sixth output signal and delivering an eleventh output signal, b. twelfth processing means receiving the sixth output signal, determining the cosine function of said sixth output signal and delivering a twelfth output signal, c. thirteenth processing means multiplying the eleventh output signal times the ninth output signal and delivering a thirteenth output signal, d. fourteenth processing means multiplying the twelfth output signal times the ninth output signal and delivering a fourteenth output signal, and e. means receiving the thirteenth and fourteenth output signals and indicating the physical state of said system.

11. Data-processing means for determining if a time varying signal characterizes a system of a first state or a system of a second state, comprising:

a. means for receiving said time-varying signal and for transforming said signal by a first nonlinear, nonconformal transformation into a first transformed signal defining values of a first coordinate, b. means for receiving said time-varying signal and for transforming said signal by a second nonlinear, nonconformal transformation into a second transformed signal defining values of a second coordinate, and c. means for combining time-related values of said first and second coordinates to generate, for each pair of combined values, a point in a plane divided into a first region for occupancy by points resulting from operations on a time-varying signal characterizing a system of said first state, and a second region for occupancy exclusively by points resulting from operations on a time-varying signal characterizing a system of said second state.

12. Data processing means as in claim 11 wherein:

d. the means of subparagraph (a) includes means for transforming said time-varying signal by normalized multiple integration into a transformed signal defining values of a first polar coordinate, e. the means of subparagraph (b) includes means for transforming said time-varying signal by normalized multiple integration into a second transformed signal defining a second polar coordinate, and f. the means of subparagraph (c) includes means for deriving from the values of said first and second coordinates a set of points defining a closed curve on a polar plane.

UNITED STATES PATENT OFFICE
CERTIFICATE OF CORRECTION

Patent No. 3,602,706　　　　　　　　Dated August 31, 1971

Inventor(s) Joseph R. Levitt

It is certified that error appears in the above-identified patent and that said Letters Patent are hereby corrected as shown below:

Column 7, lines 69, 70, and 71 should read:

-- (b) transforming the time varying signal obtained in step (a) by a nonlinear coordinate transformation into a coordinate system having at least one curvilinear coordinate,--

Signed and sealed this 26th day of September 1972.

(SEAL)
Attest:

EDWARD M. FLETCHER, JR.　　　　ROBERT GOTTSCHALK
Attesting Officer　　　　　　　Commissioner of Patents

REEXAMINATION CERTIFICATE (357th)
United States Patent [19]
Levitt

[11] B1 3,602,706
[45] Certificate Issued Jun. 11, 1985

[54] DATA-PROCESSING METHOD AND MEANS FOR CLASSIFYING SIGNALS IN A FIRST OR SECOND STATE

[75] Inventor: Joseph R. Levitt, Moorestown, N.J.

[73] Assignee: Data Display Systems, Inc., New York, N.Y.

Reexamination Request:
No. 90/000,481, Dec. 14, 1983

Reexamination Certificate for:
Patent No.: 3,602,706
Issued: Aug. 31, 1971
Appl. No.: 787,335
Filed: Dec. 27, 1968

Certificate of Correction issued Sep. 26, 1972.

[51] Int. Cl.³ .......................... G06G 7/22; A61B 5/04
[52] U.S. Cl. ................................... 364/551; 128/696; 364/417; 364/516; 364/830
[58] Field of Search ........................ 364/815-818, 364/819, 851, 855; 324/77; 128/699

[56] References Cited
U.S. PATENT DOCUMENTS

| | | | |
|---|---|---|---|
| 2,214,299 | 9/1940 | Heller | 128/699 |
| 3,123,768 | 3/1964 | Burch et al. | 324/77 A |
| 3,131,297 | 4/1964 | Gates et al. | 364/815 |
| 3,186,403 | 6/1965 | Bassett | 128/699 |
| 3,323,068 | 5/1967 | Woods | 328/187 |
| 3,442,264 | 5/1969 | Levitt. | |

OTHER PUBLICATIONS

"Proposal for Study of the Uses of a Novel Display Technique for Identification of Classes of Observed Data", General Electric Proposal (GE-RSD Proposal No. N 70166), submitted to Advanced Research Projects Agency of the U.S. Dept. of Defense, Aug. 1964.

Purcell, Edwin J., Calculus With Analytic Geometry, Meredith Publishing Company, 1965, pp. 427-429; 446-447.

*Primary Examiner*—Joseph F. Ruggiero

[57] ABSTRACT

A data-processing method and means in which sets of time-varying signals characterizing systems under consideration in a known first condition or state and systems in a known second condition or state, which are not obviously distinguishable from the signals characterizing the first condition of state, are subjected to a plurality of nonlinear coordinate transformations which transform the signals into a transformed polar coordinate plane distinguishing the signals characterizing the system of the first condition or state from the signals characterizing the system in the second condition or state. In addition, using the selected transformations, first and second regions of the transformed plane are defined for characterizing transformed signals derived from systems in respectively unknown first and second conditions or states as being from systems respectively in said first and second conditions or states when contained respectively in said first and second regions.

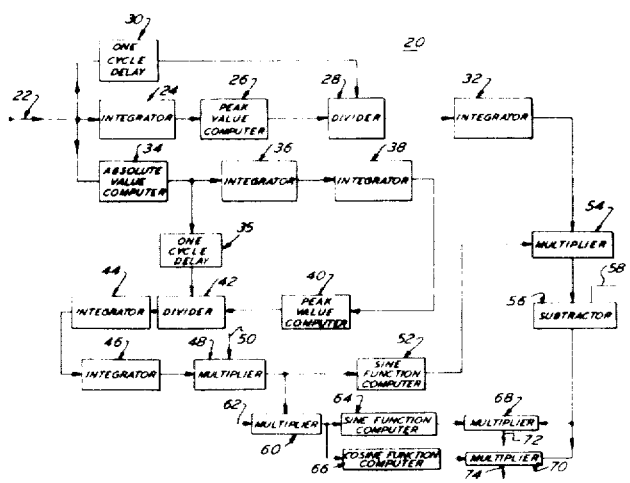

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-12 are cancelled.

* * * * *